Patented July 6, 1937

2,086,479

UNITED STATES PATENT OFFICE 2,086,479

STABLE EMULSION AND METHOD OF PRODUCING THE SAME

Walther Schrauth, Berlin-Dahlem, Germany, assignor, by mesne assignments, to "Unichem" Chemikalien Handels A.-G., Zurich, Switzerland, a corporation of Switzerland No Drawing. Application December 22, 1933, Serial No. 703,603. In Germany December 20, 1932

14 Claims. (Cl. 252—6)

This invention relates to emulsions of fats, waxes, oils and the like and has for an object to provide an improved method of producing emulsions, especially emulsions having a neutral reaction.

Another object is to provide a method of producing emulsions which will be stable.

One of the difficulties heretofore encountered in the making of emulsions has been the necessity for a slight alkalinity in order to insure stability. The present invention provides a method whereby stable emulsions of neutral reactions can be produced.

Esters of high molecular fatty acids and di- or poly-hydric aliphatic alcohols, which have at least one free hydroxyl group are particularly suitable for use in producing emulsions. These esters are also particularly effective when combined with waxes, fats and oils of animal, vegetable or mineral origin, for producing emulsions. Esters having a free hydroxyl group in the acid radical of the ester, are also suitable. It has been discovered in accordance with the present invention that by adding to such esters capillary active sulfates and sulfonates, especially those having a neutral reaction effective stable emulsions can be produced. Such substances include especially the neutral sulfates and sulfonates of high molecular mono-di- or poly-hydric alcohols having 8 or more carbon atoms in the molecule, as, for example, the alkali metal salts of the sulfonic acid or sulfuric acid esters produced from octyl, decyl, lauryl, cetyl, myristyl, stearyl, docosyl, ceryl, oleyl, ricinoleyl alcohols or other similar alcohols having from 8 to 30 carbon atoms in the molecule. The sulfates and sulfonates of alcohols having 12 to 18 carbon atoms in the molecule are the most practicable. The sulfates and sulfonates of alicyclic compounds, as for example, of naphthenic alcohols may also be used. The condensation products of aliphatic or aromatic sulfonic acids or sulfuric acid esters with fatty alcohols or fatty acids including those having a free hydroxyl group have also been found suitable as well as the other sulfates and sulfonates mentioned. Such products include Turkey red oils.

The terms "fatty alcohols" and "fatty acids" are used herein to designate those high molecular alcohols and acids of oily, fatty and soap-forming character including both the normal primary aliphatic and the naphthenic compounds.

The proportion of the sulfates and sulfonates combined with the compositions to be emulsified may vary considerably for example, they may constitute of the order of 0.5 to 25% by weight of the total mass. A preferred proportion is usually obtained when the capillary active sulfate or sulfonate constitutes of the order of 1 to 5% of the composition including the water.

Example 1

If 65 parts by weight of mono-glyceride of lauric acid are compounded with 180 parts by weight of water in which 5 parts by weight of sodium salt of the lauryl sulfuric acid ester are dissolved, an extraordinarily stable emulsion of neutral reaction is obtained.

Example 2

The compounding of 15 parts by weight of mono-palmitic acid ester of the propylenglycol with 7 parts by weight of lanoline, 8 parts by weight of vaseline and 100 parts by weight of water, in which 15 parts by weight of glycerin and 3 parts by weight of sodium sulfonate of cetyl alcohol are dissolved, results in a stable, even cosmetic cream.

Example 3

75 parts by weight of mono-glyceride of stearic acid, 150 parts by weight of sperm oil, and 1200 parts by weight of water, in which 5C parts by weight of sodium salt of the reaction product of sulfuric acid on oleyl alcohol are dissolved, are well stirred, eventually while heating, and produce an even emulsion suitable as drill oil (Bohroel).

Example 4

If 3 kg. of di-ricinolic acid ester of the diethylene glycol are mixed with 10 kg. of a 25% glycerin-solution, in which 250 g. of zinc salt of the oxy-octadecan sulfonic acid are dissolved, a homogeneous, salve-like substance of great stability results, to which, according to requirements, further fats may be added, as for example, lanoline.

Example 5

20 parts by weight of mono-oleic acid ester of butylene glycol, 50 parts by weight of vaseline and 15 parts by weight of peanut oil are thoroughly mixed, eventually while slightly heated, and to this mixture 150 parts by weight of water, in which 3 parts by weight of sodium salt of the sulfuric acid ester of the castor-oil (ricinoleyl) alcohol are dissolved, are then added gradually while stirring. A stable, creamy emulsion is obtained, which may be mixed with water or watery solutions in the same way as with fat or mineral-like substances, and which produces utmost stable emulsions when heated. These emulsions also have the power to absorb solid substances like magnesium oxide.

I claim:

1. A neutral emulsion wherein the aqueous phase is continuous and water constitutes the major constituent of the emulsion comprising as the principal emulsifying agent esters of higher fatty acids and polyhydric aliphatic alcohols, which esters have free hydroxyl groups, and the alkali metal salts of the reaction products of sulfuric acid and fatty alcohols having 8 or more carbon atoms in the molecule, the internal phase of said emulsion comprising at least one member of the group consisting of waxes, fats and oils of animal, vegetable or mineral origin.

2. A neutral emulsion wherein the aqueous phase is continuous and water constitutes the major constituent of the emulsion comprising as the principal emulsifying agent esters of higher fatty acids and polyhydric aliphatic alcohols, which esters have free hydroxyl groups, and the alkali metal salts of the reaction products of sulfuric acid and fatty alcohols having approximately 12 to 18 carbon atoms in the molecule, the internal phase of said emulsion comprising at least one member of the group consisting of waxes, fats and oils of animal, vegetable or mineral origin.

3. A neutral emulsion wherein the aqueous phase is continuous which contains a major proportion of water and which also contains material of the group consisting of waxes, fats and oils of animal, vegetable or mineral origin, the principal emulsifying agent in said emulsion comprising esters of fatty acids having 8 or more carbon atoms in the molecule and polyhydric aliphatic alcohols, which esters have free hydroxyl groups, and the alkali metal salts of the reaction products of sulfuric acid and fatty alcohols having 8 or more carbon atoms in the molecule.

4. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule, and a material of the group consisting of the alkali metal salts of the sulfates and sulfonates of fatty alcohols having 8 or more carbon atoms in the molecule, the internal phase of said emulsion comprising at least one member of the group consisting of waxes, fats and oils of animal, vegetable or mineral origin.

5. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule, material of the group consisting of waxes, fats and oils of animal, vegetable and mineral origin and a material of the group consisting of the alkali metal salts of sulfates and sulfonates of fatty alcohols having 8 or more carbon atoms in the molecule.

6. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule, and a material of the group consisting of the alkali metal salts of the sulfates and sulfonates of aliphatic alcohols having 12 to 18 carbon atoms in the molecule, the internal phase of said emulsion comprising at least one member of the group consisting of waxes, fats and oils of animal, vegetable or mineral origin.

7. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule, and material of the group consisting of the alkali metal salts of the sulfates and sulfonates of aliphatic alcohols having 12 to 18 carbon atoms in the molecule, the internal phase of said emulsion comprising at least one member of the group consisting of waxes, fats and oils of animal, vegetable or mineral origin.

8. A neutral emulsion of oil or wax-like material wherein the aqueous phase is continuous and water constitutes the major constituent of the emulsion containing as the principal emulsifying agent a neutral salt of a sulfonated higher aliphatic alcohol and an ester of a lower polyhydric aliphatic alcohol and a higher fatty acid, said ester having at least one free hydroxyl group.

9. A neutral emulsion of oil or wax-like material wherein the aqueous phase is continuous and water constitute the major constituent of the emulsion containing as the principal emulsifying agent a neutral salt of a sulfated aliphatic alcohol having at least 8 carbon atoms and an ester of a lower polyhydric aliphatic alcohol and a higher fatty acid, said ester having at least one hydroxyl group.

10. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule and from 0.5% to 25% by weight of an alkali metal salt of a material of the group consisting of the sulfate and sulfonates of fatty alcohols having from 8 to 30 carbon atoms in the molecule, the internal phase of said emulsion comprising at least one member of the group consisting of waxes, fats and oils of animal, vegetable or mineral origin.

11. A neutral emulsion wherein the aqueous phase is continuous and water constitutes the major constituent of the emulsion comprising material of the group consisting of mono- and di-glycerides and mono-glycol esters of high molecular aliphatic acids having 8 or more carbon atoms in the molecule and from 1% to 5% by weight of an alkali metal salt of a material of the group consisting of the sulfates and sulfonate of aliphatic alcohols having from 12 to 18 carbon atoms in the molecule, the internal phase of said emulsion comprising at least one member of the group consisting of waxes, fats and oils of animal, vegetable or mineral origin.

12. A neutral emulsion comprising water as its major constituent, and also containing the mono-glyceride of lauric acid and sodium lauryl sulfate, the external phase of said emulsion comprising water, and the internal phase comprising at least one member of the group consisting of waxes, fat and oils of animal, vegetable or mineral origin.

13. A neutral emulsion comprising water as its major constituent, and also containing the mono-palmitic acid ester of propylene glycol, lanoline, vaseline, glycerine, and sodium cetyl sulfonate, the external phase of said emulsion comprising water.

14. A neutral emulsion comprising water as its major constituent, and also containing the mono-glyceride of stearic acid, sperm oil, and the sodium salt of the reaction product of sulfuric acid and oleyl alcohol, the external phase of said emulsion comprising water.

WALTHER SCHRAUTH.